April 11, 1939. R. A. ROAD ET AL 2,154,411
INTERCHANGEABLE METER BASE
Filed Sept. 1, 1937 4 Sheets-Sheet 1

INVENTORS
STANLEY S. GREEN
RICHARD A. ROAD
BY Louis Robertson ATTY

April 11, 1939.    R. A. ROAD ET AL    2,154,411
INTERCHANGEABLE METER BASE
Filed Sept. 1, 1937    4 Sheets-Sheet 2

INVENTOR:
STANLEY S. GREEN
RICHARD A. ROAD
BY Louis Robertson
ATTY.

April 11, 1939.　　　R. A. ROAD ET AL　　　2,154,411
INTERCHANGEABLE METER BASE
Filed Sept. 1, 1937　　　4 Sheets-Sheet 3
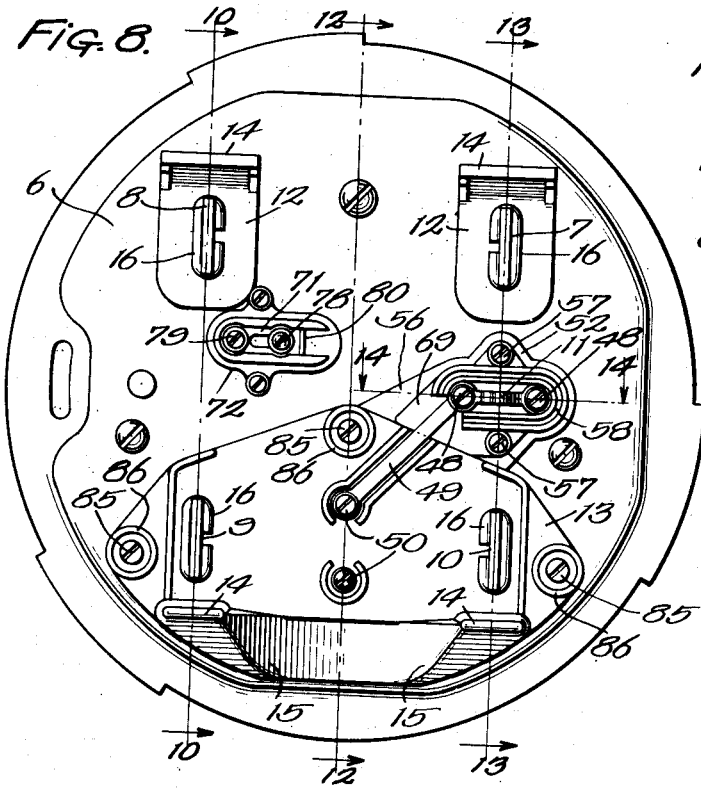
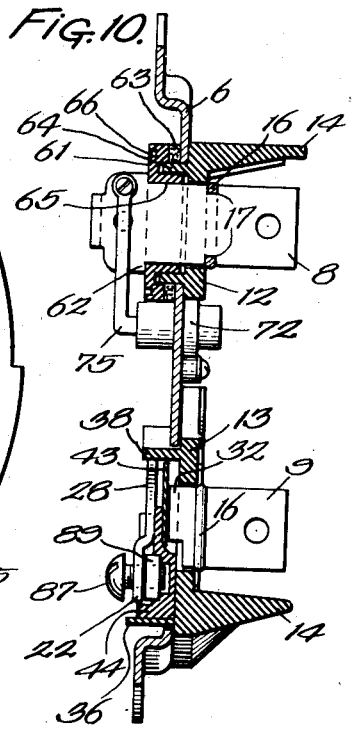
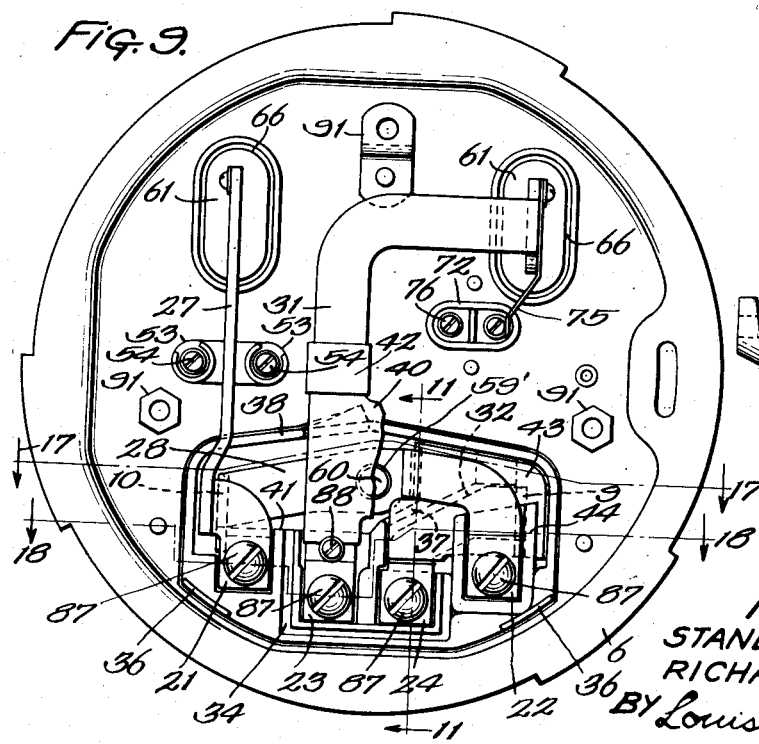
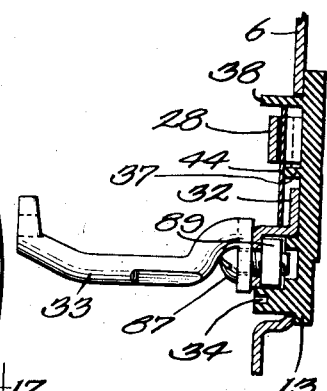
INVENTOR:
STANLEY S. GREEN
RICHARD A. ROAD
BY Louis Robertson
ATTY April 11, 1939.    R. A. ROAD ET AL    2,154,411
INTERCHANGEABLE METER BASE
Filed Sept. 1, 1937    4 Sheets-Sheet 4
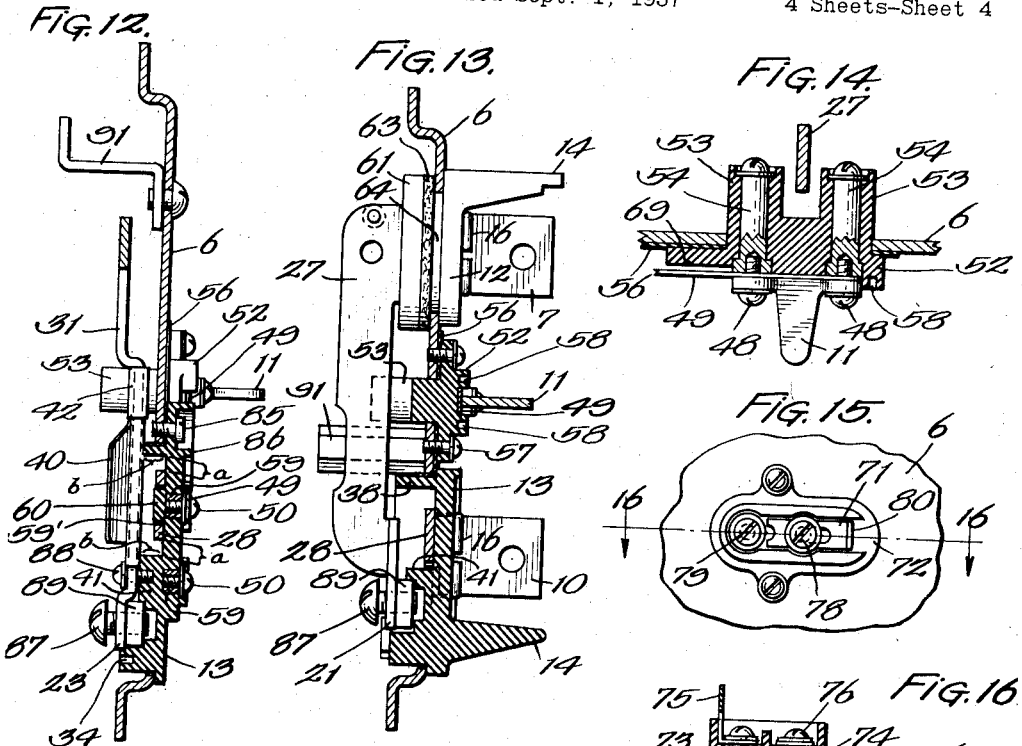
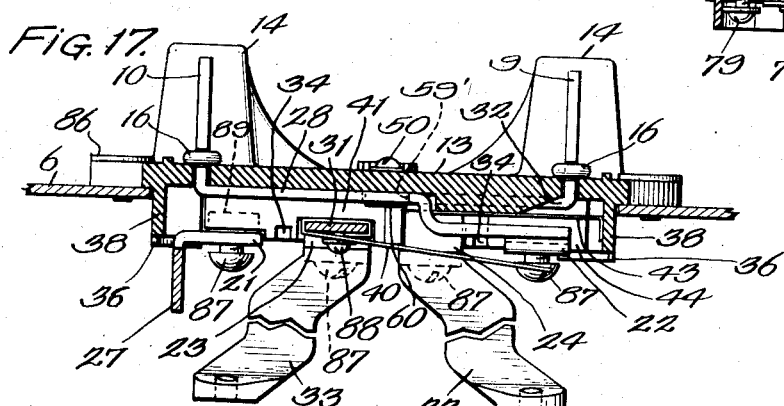
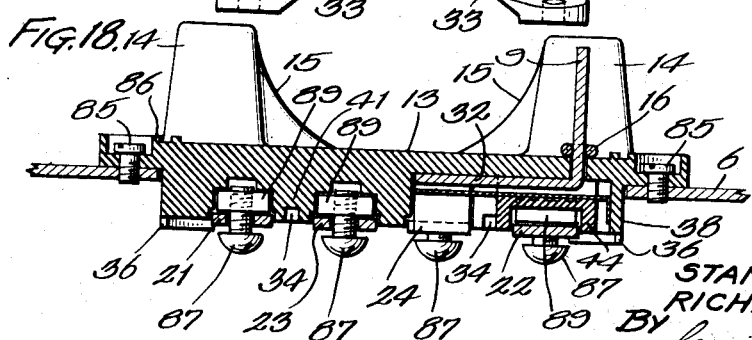
INVENTOR:
STANLEY S. GREEN
RICHARD A. ROAD
BY Louis Robertson ATTY.

Patented Apr. 11, 1939

2,154,411

UNITED STATES PATENT OFFICE 2,154,411

INTERCHANGEABLE METER BASE

Richard A. Road and Stanley S. Green, La Fayette, Ind., assignors to Duncan Electric Manufacturing Company, La Fayette, Ind., a corporation of Illinois Application September 1, 1937, Serial No. 161,893

12 Claims. (Cl. 175—222)

This invention relates to electric meters and particularly to base plate assemblies for such meters adapted to plug into the special meter sockets now frequently provided for the purpose. Such a base plate not only supports the meter mechanism on its front side but also carries the connecting plug-in blades at its rear.

The service wires are brought into a separate socket and connected to spring connectors or jacks each adapted to receive one connecting blade on the base plate so that the base plate with meter mechanism thereon may be simply plugged into the socket. With such an arrangement several problems are presented.

It is desirable for commercial reasons to use the same meter mechanism as used in the old type of bottom-connected base. In such mechanism the current coils are provided with terminals at the bottom of the meter element. In the socket meters it is not practical to have all of the connecting blades positioned immediately adjacent the desired points of connection for the meter elements, and in fact it is the conventional practice to position the knives at four remote points within the socket. Accordingly, it is necessary to run connections from the knives to the desired points for connection with the current coils. In running such connections it is desirable to conserve space as much as possible particularly in connection with a polyphase meter in which two driving elements are used, one in front of the other operating on the same disc, with the result that the glass meter cover must be undesirably deep unless extreme compactness is resorted to.

In running the connections on the base and providing suitable connecting terminals for the element it is necessary to thoroughly insulate the connecting straps from each other and from the base plate as well as to mount them sufficiently firmly in place. The most convenient insulating material is that known commercially as "Bakelite". In attempting to provide the compactness necessary for the reasons pointed out above a serious defficulty arises in the use of "Bakelite". When two connectors are mounted on a "Bakelite" block with only a small length of "Bakelite" surface between them, there is danger that a conductive path will be formed along the "Bakelite" by surface carbonization as the result of a spark passing along the surface due to some abnormal cause such as a bolt of lightning. Once such carbonization begins it is cumulative in nature, by which is meant that the slight current which passes through the conductive path thus formed produces further carbonization, which in turn permits more current to pass. A highly conductive path can thus be built up which obviously would be disastrous to insulation. One of the serious problems which the present invention has had to solve is therefore the provision of a sufficient length of "Bakelite" surface wherever such surface extends between two conductors to substantially eliminate the danger of the formation of conductive paths along the "Bakelite". One important feature of the invention in solving this problem is the use of an insulating material not subject to carbonization, such as insulating paper, not for its usual purpose of directly separating conductors but for the unusual purpose of partially separating a conductor from an insulator to lengthen the path which might otherwise be available along the surface of the insulator between conductors. This permits an exceedingly compact arrangement of the connecting straps with safety.

Another problem which has arisen in connection with socket type meters arises by virtue of the fact that there are two different types of sockets, one for service wires coming to the meter from a vertical direction and one for service wires coming to the meter from a horizontal direction. If there were only four connections this would probably present no additional difficulty, but for polyphase meters a fifth connection is needed, which requires a fifth contact blade. In order to be out of the way of the service wires, the blade for such fifth contact is conventionally mounted near the side of the case for vertical service wires and near the bottom of the case for horizontal service wires. To avoid the necessity of providing two different base plates, and to enable any meter to fit any position, some base plates have been provided with two blades for the fifth connection, one in each location. Since the one not used is sometimes in the way, these blades have sometimes been notched to permit one not used to be broken off. This has prevented changing the meter to a different location without a great deal of trouble. To solve the problem of providing permanent and easy interchangeability, the present invention contemplates a single fifth contact blade readily interchangeable between the two necessary positions with its connections complete in each instance. Furthermore, this feature of interchangeability has been worked out in such a way that all of the necessary parts for either connection are carried by the base plate at all times, and the change does not necessitate removing the glass cover.

Still another problem that has arisen in connection with socket type meters is the anchoring of the connecting blades to the insulators by which they are mounted on the base plate. It is desirable to have an anchoring means which distributes the forces sometimes present to a sufficiently large number of points to minimize breakage of the insulators. Nevertheless, the anchoring means must be easily applied, inexpensive, and free from other troubles. According to the present invention a very simple expedient is adopted of notching the knives at both edges and wrapping a stiff piece of wire around each knife so that it extends through both notches so that the wire forms two support points for each notch and thus four support points for each knife. This has a further advantage of compactness and greater tolerance since the wire anchors are so compact that they can fit into the V-shaped opening of the spring jacks if necessary.

Additional objects will be apparent from the following description and from the drawings, in which:

Fig. 8 is a rear view of the base plate of Fig. 2.

Fig. 9 is a front view of the base plate of Fig. 2.

Fig. 10 is a sectional view taken substantially on the line 10—10 of Fig. 8, showing the insulation of the closely spaced connecting straps 28 and 32 in the terminal block.

Fig. 11 is a fragmentary sectional view taken approximately on the line 11—11 of Fig. 9 with a riser 33 added.

Fig. 12 is a sectional view taken approximately on the line 12—12 of Fig. 8.

Fig. 13 is a sectional view approximately on the line 13—13 of Fig. 8.

Fig. 14 is a fragmentary sectional view taken approximately on the line 14—14 of Fig. 8.

Fig. 15 is a fragmentary detail view of the potential disconnect unit in the disconnected position.

Fig. 16 is a fragmentary sectional view taken substantially on the line 16—16 of Fig. 15.

Fig. 17 is a horizontal sectional view taken approximately on the line 17—17 of Fig. 9, showing the upper side of the terminal block, also showing a top view of the risers 33.

Fig. 18 is a horizontal sectional view through the terminal block taken approximately on the line 18—18 of Fig. 9.

Figure 2:
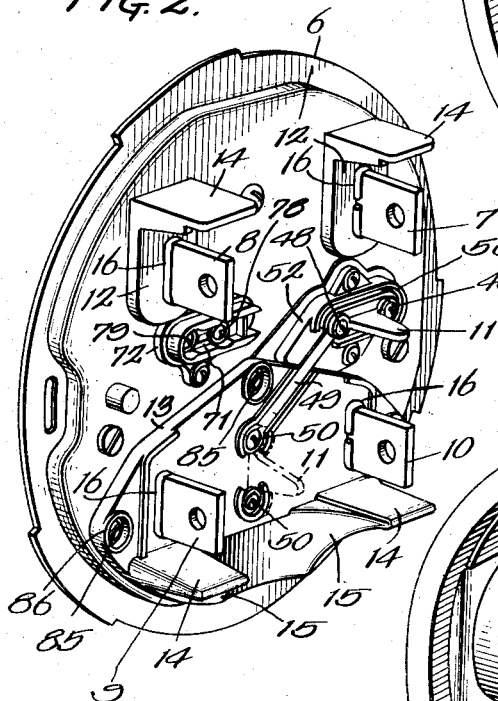
Fig. 2 is a perspective view of the back side of the preferred form of base plate of this invention, the small fifth blade 11 (the common potential terminal) being positioned at the side to fit the socket of Fig. 1.

Although this invention may take various forms, only one has been chosen for the purpose of illustration. In fact, one of the features of the invention is that the single base plate shown in Fig. 2 is adaptable for use with a socket 1 arranged for vertical mounting or a socket 2 arranged for horizontal mounting. Each of these sockets includes four spring jacks 4 adapted to be connected to the service wires and positioned for safety and accessibility at four remote points in the sockets. The socket 1, which is adapted to have the service wires enter at the top and bottom, has a fifth spring jack 5 positioned at the side of the socket so as to leave the vertical passage open, and the socket 2 has a corresponding spring jack 5' positioned at the bottom of the socket so as to leave the horizontal passage open for the service wires. It should be mentioned that no part of the present invention is found in the sockets alone, the novelty being in the base plate assembly of Fig. 2 or its combination with the sockets. The base plate assembly of Fig. 2 includes a metal plate 6 adapted to have a meter mechanism secured to its front side and having on its back side, seen in Fig. 2, blades 7, 8, 9 and 10 adapted to slip into the jacks 4, and potential terminal blade 11 adapted to slip into the jack 5. These blades are of course insulated from the plate 6, and it has heretofore been common to insulate each of them with a separate insulator similar to the insulators 12. According to the present invention the two lower insulators are replaced by a single terminal block 13 having various novel features. It may be noted that a leg 14 is formed as an integral part of the insulation adjacent each of the blades 7 to 10, these legs serving to protect the contact blades 9 and 10 from accidentally contacting the socket when the meter is being put in or taken out and to support the base plate assembly and meter mechanism on a table when they are removed from the socket. The legs on the terminal block 13 are tapered on their under sides and are extended as seen at 15 in Fig. 8 to help guide the base plate and meter assembly to a vertically centered position in the socket.

*Anchoring means for blades*

In order for the jacks 4 to complete the circuit satisfactorily it is necessary that they be quite stiff so that they will grip the blades 7 to 10 tightly. Under such circumstances it takes a considerable force to press the base plate assembly onto the socket or, in other words, to press the blades 7 to 10 into the jacks 4. The reaction of this inserting force must be withstood by the insulating members 12 and 13. This is not a simple matter since the blades 7 to 11 (which carry heavy currents) must pass through the base plate 6, and it is not practical to provide them with pedestals such as that provided on blade 11. The anchoring means which have been used heretofore have either been of such nature as to cause comparatively frequent breakage of the insulators 12 or they have been undesirably complicated from the standpoint of cost, ease of application, or space required. For example, a cotter pin through a blade rests on only two points of the "Bakelite" and hence is likely to break it, and furthermore they require additional space between the jacks 4 and the insulators 12 or 13.

Figure 7:
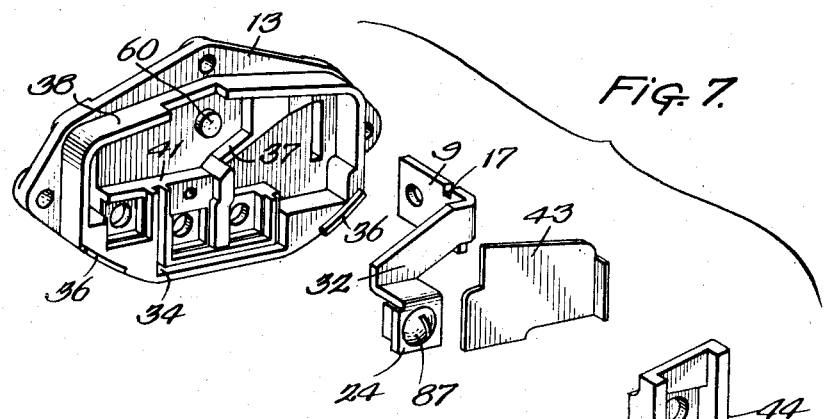
Fig. 7 is an exploded perspective view showing the hidden portions of the terminal block assembly of Fig. 5.

According to the present invention the anchoring means comprises simple wire rings 16 which are wrapped around the blades 7 fitting into notches 17 therein, these notches being seen best in Fig. 7.

The simplicity of this anchoring means both in its cost and application is obvious. Its simplicity from the standpoint of space is apparent from Fig. 4, in which it is seen that it requires no additional space since it may lie within the V-shaped mouth between jaws 18 of jacks 4. Ordinarily there is enough room between the tip of the jack and the insulating mounting of the blades to accommodate the thickness of the anchor rings 16, but the use of an anchor of a shape which can extend down into the V-shaped opening between the jaws 18 if necessary leaves the tolerance which is essential or very valuable commercially.

Figure 4:
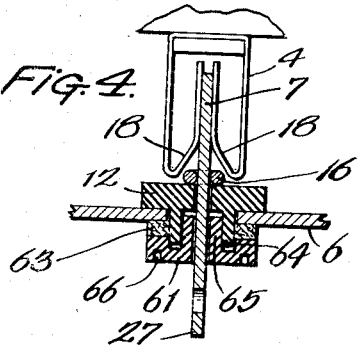
Fig. 4 is a fragmentary sectional view showing the way in which the anchor wire for the blade can fit into the V-shaped jaws of the socket jack if necessary, and showing the construction of one form of insulator.

It is also apparent from Fig. 4 that the anchor ring 16 rests on the insulator 12 along both of the flat sides of the blade 8. Of course, the thrust will probably be transmitted mainly adjacent the notches 17, but nevertheless there are four support points, one being at each side of each of the notches. This distribution of the insertion force between four points for each blade substantially eliminates breakage of the insulators 12 or other insulating mounting even if the inserting force is abnormally high as, for example, when the blades 7 to 11 are out of alinement with the jacks 4.

Arrangement of connecting straps

Figure 5:
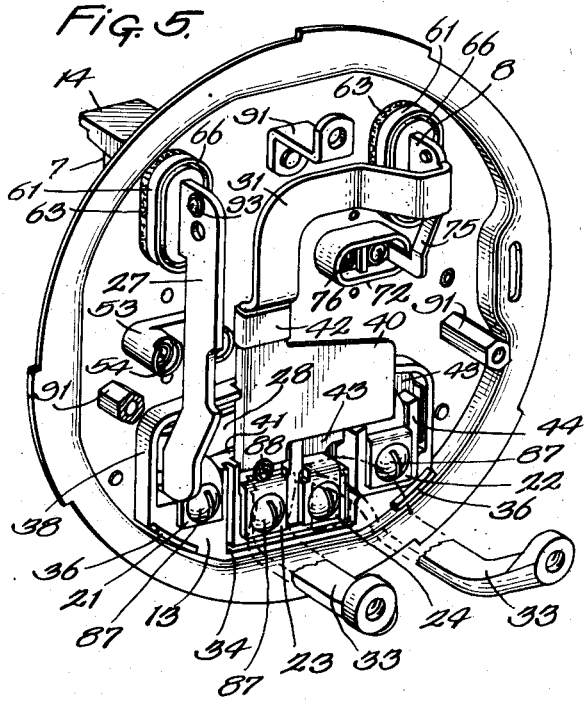
Fig. 5 is a perspective view of the front side of the base plate of Fig. 2.

All the blades 7 to 10 extend through the base plate 6 and curve in one direction or another to extend to suitably positioned terminals in the terminal block 13. The terminal block 13 is thus provided with four terminals 21, 22, 23 and 24, as seen in Fig. 5. Referring to the circuit diagram of Fig. 6 it is seen that one current coil 25 of the meter element is connected to blades 7 and 10, but the conventional current coils have their terminals positioned to engage terminals 21 and 22 and therefore it is necessary that terminals 21 and 22 be connected with blades 7 and 10. This is accomplished by means of connecting straps 27 and 28 which may be integral with their associated blades and terminals. In this case the combined blade, connecting strap and terminal is stamped from a piece of sheet metal of good conductivity. In the types of meters having two current coils, as the polyphase meter of Fig. 6 for example, the second current coil 29 is connected to blades 8 and 9. This current coil, however, is most easily connected to terminals positioned as are the terminals 23 and 24, and it is therefore desirable to provide connecting straps 31 and 32 respectively connecting blade 8 with terminal 23 and blade 9 with terminal 24. It may be mentioned that in the case of the polyphase meter of Fig. 6 the second current coil 29 has its terminals spaced as are terminals 21 and 22, but a considerable distance in front of these terminals since the two current coils are identical. This front current coil may nevertheless be connected to terminals 23 and 24 by the simple expedient of two metallic connectors or risers 33, seen in Fig. 19, which have their outer terminal ends positioned directly in front of terminals 21 and 22.

Insulation of connecting straps

From the foregoing and from Figs. 5 and 9 it is evident that connecting strap 27 passes over connecting strap 28, which in turn passes under connecting strap 31 and over connecting strap 32. With such a crisscrossing of connecting straps all within the shallow depth of the terminal block 13 it is evident that a very difficult problem of insulation is presented. This problem is heightened by one objectionable quality of the material known commercially as "Bakelite", which is nevertheless the most satisfactory material for the formation of the terminal block 13 because of its other excellent qualities, including its ease of molding. The objectionable quality is the possibility of surface carbonization and the resultant formation of conducting paths along the surface of the "Bakelite". For the voltages commonly encountered in metering service, it has been found that the formation of such conducting paths is substantially eliminated if the length of any "Bakelite" surface extending between two conducting members of different potential is at least half an inch. Accordingly, one of the problems solved by this invention is the provision within the terminal block 13 of the necessary minimum surface bridges of half an inch.

The original working out of the arrangement of connecting straps shown was an important portion of the invention since it kept most of the surface bridges over the half-inch minimum and all of the others close to the half-inch minimum. For example, as is apparent from Figs. 9 and 18, a groove 34 is provided between terminals 21 and 23 and terminals 22 and 24 so that the length of surface from one terminal to the other, including the distance down into the groove 34 and up out of it, is at least half an inch. It should be mentioned that Figs. 17 and 18 of the original drawings are drawn approximately to full scale, though they will appear at ⅗ full size in the printed patent. Likewise, upstanding flanges 36 are provided on the corners of terminal block 13 to increase the surface distance between terminals 21 and 22 and the base plate 6. Similarly, a rib 37 sufficiently separates connecting straps 28 and 32 where they are side by side.

Insulation of insulation

In some instances the space requirements for the meter mechanism made it impossible to space the connecting straps as far from the others as would be necessary to provide the minimum bridging distance by ordinary means. For example, the connecting strap 31, since it must be countersunk within the rim 38 of terminal block 13, is a little too close to connecting strap 28. This distance as seen in Fig. 12 is only the distance $a$ plus the distance $b$. Likewise, connecting strap 28 is a little too close to connecting strap 32. It was therefore necessary to do something to increase these distances. This is done by the very simple expedient of inserting a piece of insulating paper as a blockade for the short surface bridge which would otherwise be present, requiring that any surface path on the "Bakelite" extend around the piece of paper. Thus, as seen most clearly in Figs. 5 and 17, a strip of paper 40 is wrapped around the lower portion of connecting strap 31 so that there is no short surface path from connecting strap 28 to connecting strap 31. In fact, the path from strap 28 upwardly along the "Bakelite" to strap 31 is entirely blocked off by the paper 40. The path from strap 28 downwardly is safely elongated by the amount that the paper 40 overlaps the high portion 41 of terminal block 13, this amount being enough to make the total length of the surface bridge greater than the half-inch required for safety. The paper 40 extends far enough upwardly on strap 31 to sufficiently elongate any surface bridge between it and base plate 6, and for convenience is secured in place by a wrapping of gummed tape 42.

As seen best in Figs. 7 and 9, a similar strip of insulating paper 43 is provided between connecting straps 28 and 32. In this instance, however, the mere insertion of the paper 43 would not be sufficient to provide the distance required, and it was therefore necessary to provide a separate "Bakelite" insert 44, seen best in Fig. 7, which, as seen in Figs. 9 and 10, overlaps connecting strap 32 and the strip of paper 43. With this arrangement the shortest "Bakelite" path between connecting straps 28 and 32 extends from strap 28 down along the back side of insert 44 (in order to get around paper 43) and then up along the terminal block 13 to the connecting strap 32. This distance is a great deal more than the half-inch required for safety.

Interchangeable common potential blade

Figure 1:
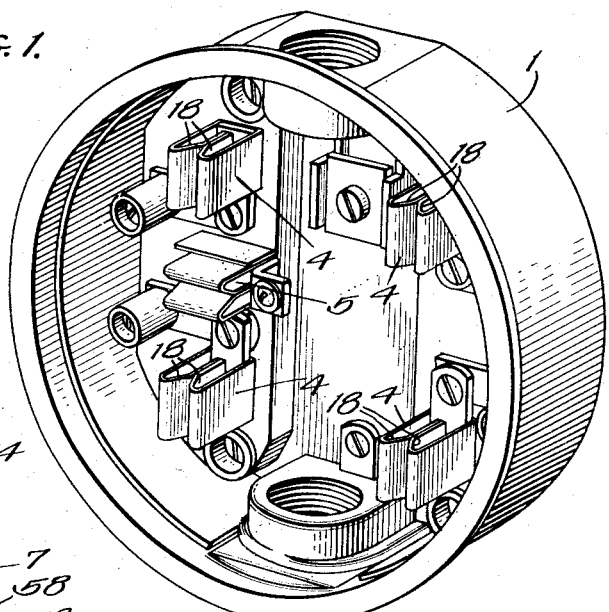
Fig. 1 is a perspective view of one form of socket which the base plate of this invention is designed to fit, the socket being arranged for the service wires to enter through the top and bottom.
Figure 3:
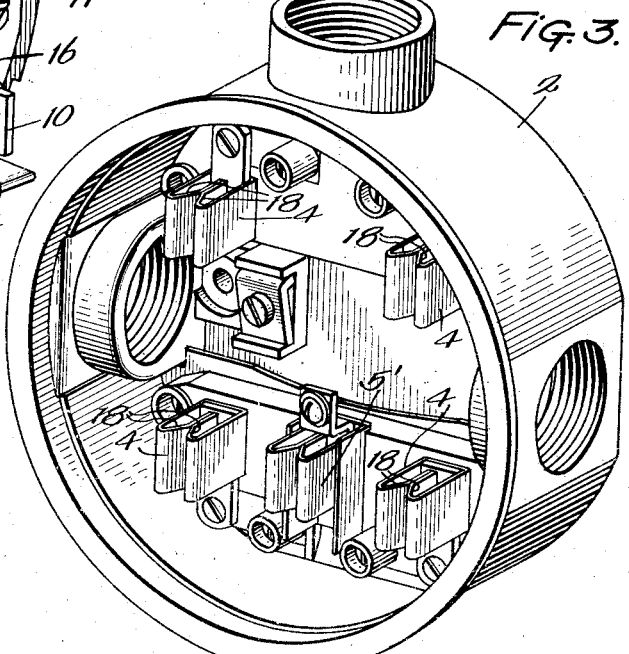
Fig. 3 shows another form of socket, this one being arranged for the service wires to enter through the sides, and the spring jack 5' for the potential terminal blade 11 therefore being positioned at the bottom, thus requiring a change of position of the terminal blade shown in Fig. 2.
Figure 6:
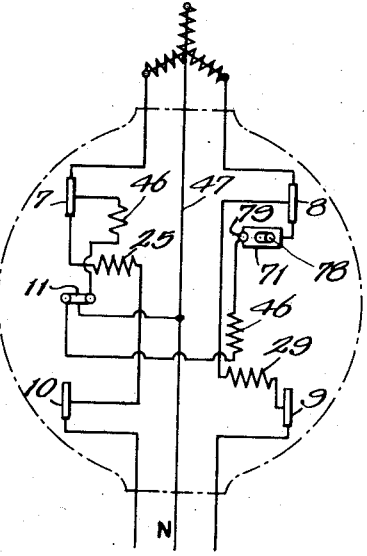
Fig. 6 is a typical circuit diagram for a polyphase meter with one type of circuit, showing the connections necessary from the terminal blades.

As seen from Fig. 6, it is necessary in polyphase measurements to connect one end of each of the potential coils 46 to the neutral or third wire 47 of the service wiring. This is done through the jack 5 positioned at the left in Fig. 1 or positioned at the bottom in Fig. 3. Because this jack must sometimes be in one position and sometimes in the other, it is desirable to have the common potential blade 11, which plugs into it, interchangeable between the two corresponding positions. Thus, in Fig. 2 the blade 11 has been shown in full lines in the side position for the vertically arranged socket of Fig. 1. However, it may be moved to the position shown in dotted lines merely by unscrewing the two screws 48 and replacing them and securing it in the dotted line position with the screws 50. The blade 7 is then connected to a connector at its original position by a connecting strap 49. This change of position can be made at any time and repeatedly during the life of the meter without removing the glass cover, and avoids the waste of material and inconvenience of having two alternate blades one of which would often be in the way.

The blade 11, when in its side position as seen in Fig. 2, is supported on an insulating terminal member 52 which extends through the base plate 6 as seen in Fig. 14. The front of this insulating block 52 is shaped in the form of insulating posts 53. Each of these insulating posts has a connecting post 54 extending therethrough for connection with the connecting strap 49 and the blade 11. This is a very simple arrangement by which each potential coil may be connected to one of the posts 54 and through it to the common potential blade 11. It also permits the posts 53 to be high enough to provide the necessary half-inch minimum surface length of the "Bakelite" insulation, of which the posts 53 are formed, in spite of the fact that the connecting strap 27 is so positioned that the insulating unit 52 with its posts 53 must straddle this connecting strap 27.

The insulating member 52 which supports the blade 11 in its side position is made entirely separate from the terminal block 13 since neither it nor the blade 11 needs to be provided in the greater proportion of meters manufactured. By making this unit separate it may therefore be omitted in the great majority of cases. Because it is separate, however, there is another instance of the problem of maintaining the minimum length of surface bridge, namely between the strap 49 and the base plate 6. This is accomplished by inserting the insulating paper 56 under the insulating block 52 and extending under the terminal block 13. Because the block 52 is secured to the plate 6 by screws 57 a groove 58 is provided extending between the screws and the strap 49 or blade 11 so as to provide the minimum safe length of the surface bridge at this point. Also the portion 69 of the insulation extending under strap 49 is depressed so as to be out of contact therewith.

The screws 50 screw into inserts 59 molded into the "Bakelite" block 13, as seen best in Fig. 12, the inserts 59 being knurled or otherwise specially shaped to assure their being held firmly by the "Bakelite". The position of the upper insert 59 which would extend approximately into contact with connecting strap 28 if no special provision were made to the contrary introduces an additional problem of compactness. It was solved by widening the strap 28 and forming a hole 59' therein, as seen best in Fig. 7, and shaping the "Bakelite" with a lug 60 extending through this hole and safely separating the insert 59 from the strap 28. The lug 60 also insures that the strap 28 will remain centered between the flange 38 and the opposite high portion 31 of the terminal block 13.

Divided insulators

The insulators 12 for the blades 7 and 8 are made in two pieces, the back portion, to which the number 12 is applied, and the front portion 61. These are both seen at the upper portion of Fig. 10. The blade 8 is provided with shoulders 62 which rest against the front insulator 61, and the anchor 16 rests against the back insulator 12. The need for the two insulators is so as to give support for the blade 8 in both directions against the base plate 6 without having to resort to attaching the insulator 12 to the base plate 6 with screws. A felt washer 63 is provided for preventing the entrance of dust or moisture. For various reasons including the space available for the insulators 12 and 61 it is desirable to have the hole in the plate 6, through which the blade 8 and the insulator 12 extend, only a little larger than the cross section of the blade 8 with the result that the metal base plate 6 is not spaced from the blade by the desired half-inch.

In the preferred form of divided insulator the minimum safe surface bridging distance is assured by providing each of the insulators 12 and 61 with a telescoping flange 64 or 65. It should be observed that it is not sufficient to provide just one of these insulators with a telescoping flange, unless it is made excessively long, for the reason that the bridging path would only have to follow one side of the flange. With both of the telescoping flanges 64 and 65, however, the shortest surface path from blade 7 to plate 6 is along the end of flange 65, down the length of either flange 65 or 64, across the end of flange 64, and up along the length of flange 64. The path on the outside of insulator 61 may be lengthened if necessary by the provision of a groove 66 extending around the blade 8.

Potential disconnect

For some test purposes it is desirable to disconnect the potential coil 46. This may be accomplished very easily without even having to remove the glass cover from the base plate 6 by operation of a disconnect link 71 shown in the closed position in Figs. 2 and 8, and shown in detail in the opened position in Figs. 15 and 16. This disconnect link 71 slides on an insulator 72 through which extend two binding posts 73 and 74. The binding post 73 is connected by connecting strap 75 to blade 8 as seen in Figs. 5, 9 and 10. The binding post 74 is provided with a screw 76 with which a lead from the potential coil 46 may be connected. Disconnect link 71 slides on screw 78 at the back end of binding post 74 and connects or disconnects with screw 79 on the back end of binding post 73. The link 71 is provided with a lug 80 forming a handle to facilitate its operation.

Features of assembly

In assembling the various parts of the base plate assembly the terminal block 13 may first be applied to the back of the base plate 6 and secured in place by screws 85. The possibility of a short surface bridge from one of the screws 85 to a conducting member is prevented by rings 86 surrounding the screws 85. Next, the parts shown in Fig. 7 are inserted into the terminal block 13 in the order which is apparent from this figure, except that the terminal screws 87 are omitted for the present. Thereafter, the connecting strap 31 with the blade 8 forming part thereof is applied, the insulator 61, the felt washer 63 and the paper wrapping 40 having been previously applied to the blade 8 and strap 31. A screw 88 extending through strap 31 may conveniently be screwed into a hole in the "Bakelite" block 13 to hold the parts in place. Next, the fourth connecting strap 27 and its blade 7 may be applied, the insulator 61 and associated felt washer 63 having been previously applied thereto. The wire anchor rings 16 may now be applied, being wrapped tightly around the blades and fitting into the notches therein. The assembly of the remaining parts is obvious from their construction. It should be mentioned, however, that in assembling the parts of the terminal block 13, a nut 89 is placed under each of the terminals 21 to 24. This is done to avoid the necessity of threading the terminals and for the sake of providing greater strength. The nuts are held from turning when the screws are tightened into them by the shape of the recesses in which they fit. The risers 33 may be applied to terminals 23 and 24 either before or after the meter mechanism is secured to the base plate 6.

For mounting the meter mechanism the base plate 6 is provided with the three posts 91, each of which is secured to the base plate 6 by a suitable screw. The meter mechanism, having been previously at least partially assembled, is secured to these posts by suitable screws. It will include a current coil 25 (Fig. 6) so shaped that its leads will contact the terminals 21 and 22 so that they may be secured thereto by suitable screws screwing into the nuts 89. When the risers 33 are provided, the meter mechanism will include a second current coil identical to the first but positioned to contact the outer ends of the risers 33 and to be secured thereto by suitable screws. In a single phase meter having two current coils on one driving element the second current coil will be provided with leads adapted to be connected directly to the terminals 23 and 24. The potential coil 46 cooperating with current coil 25 will have its leads connected to blade 7 by a screw 93 and to one of the posts 53 which is connected to blade 11. The potential coil 46 cooperating with current coil 29 will be connected to the other post 54 and to the screw 79 of the potential disconnect unit. When the meter element has thus been connected, the usual glass cover may be applied over it, secured to the base plate 6 and sealed thereto in the usual way. The complete meter is then ready to be plugged into one of the sockets shown in Figs. 1 and 3 and to be secured thereto by the usual split retaining and sealing band.

Economy of manufacture

An important consideration in designing the illustrated base plate assembly has been the matter of cost. In any highly competitive field the saving of a few cents on each meter is very material when the quantity of production is relatively low. It is necessary to provide a minimum of expensive molds, dies or other tools. The present invention has satisfied this requirement by utilizing so far as possible units which were already manufactured for other base assemblies and by keeping special parts as small as possible. Thus, the terminal block 13 is about as small as it could be and still insulate the terminal straps from one another safely and support them with sufficient strength. It is so designed that it can be used together with the telescoping insulators 12 and 61 for the remote blades 7 and 8, these insulators being the same as have been used for some time in large quantities and therefore being of low cost. This has also made possible the use of the standard and relatively inexpensive disconnect unit 72. The provision of the separate block 52 for the side position of the interchangeable common potential terminal blade 11 has permitted the terminal block 13 to be kept at its minimum size.

The disclosures of this application are illustrative and the invention is not to be limited by them. In fact, if modifications or improvements are not at once obvious, they may be devised in the course of time to make additional use of the broad ideas taught and covered by this application. The claims are intended to point out novel features and not to limit the invention except as may be required by prior art.

We claim:

1. The combination of a socket having a jack with jaws shaped to form a V-shaped mouth, and a meter assembly adapted to plug into the socket by means of a blade adapted to plug into the jack, including an insulating member through which the blade passes, and means for transmitting the plug-in thrust from the insulating member to the blade comprising a wire wrapped snugly around the blade extending from one side through a notch in both edges thereof bearing on the insulating member on each side of both notches and shaped to be capable of fitting into the V-shaped mouth of the jack.

2. The combination of a socket having a jack with jaws shaped to form a V-shaped mouth, and a meter assembly adapted to plug into the socket by means of a blade adapted to plug into the jack, including an insulating member through which the blade passes, and means for transmitting the plug-in thrust from the insulating member to the blade comprising a wire wrapped snugly around the blade extending through and lying substantially entirely within a U-shaped notch in at least one edge thereof and shaped to be capable of fitting into the V-shaped mouth of the jack.

3. A base plate assembly for socket-type meters including a base plate, an insulating support member carried thereby, a blade extending therethrough and provided with a notch on each edge, and anchoring means for the blade comprising a piece of wire wrapped around the blade, bent to extend from one side around both edges, fitting in the notches therein and bearing against the insulating support member.

4. A plug-in device including an insulating support member, a plug-in blade extending therethrough, and means for anchoring the blade in the support member comprising a member passing through two spaced points of the blade and bearing on the insulating support member on opposite sides of the blade adjacent each of the two spaced points, whereby the thrust is distributed between four spaced points on the insulating support member.

5. A base assembly for detachable watt-hour meters incuding a base plate, a single unitary block of molded electrical insulation occupying an area substantially less than one-half the entire base plate area, four terminal straps carried by the plate and having terminals including binding screws on said blocks, two of the terminal straps resting against a front face of the block and each having a blade portion extending through the block, each blade having U-shaped notches formed in opposite edges thereof adjacent the back side of the block, and wires wrapped around the blades and nesting in the notches therein for anchoring the blades, and means on the rear side of the insulator block for attaching thereto a contact member entirely separate from and insulated from all of said terminal straps.

6. A base assembly for detachable watt-hour meters including a base plate, a single unitary block of molded electrical insulation occupying an area substantially less than one-half the entire base plate area, four terminal straps carried by the plate and having terminals including binding screws on said block, two of the terminal straps resting against a front face of the block and each having a blade portion extending through the block, and means on the rear side of the insuluator block for attaching thereto a contact member entirely separate from and insulated from all of said terminal straps, and the other two terminal straps extending away from the block, passing through the plate at the points remote therefrom, and a separate small insulator unit at each of these points for insulating the terminal straps from the plate and supporting them with respect thereto.

7. A base assembly for detachable watt-hour meters including a base plate, a single unitary block of molded electrical insulation occupying an area substantially less than one-half the entire base plate area, four terminal straps carried by the plate and having terminals including binding screws on said block, two of the terminal straps passing through the insulating block and the other two extending away from said block, passing through the plate at points remote therefrom, and each supported near its remote end and insulated from the plate by a pair of separate telescoping insulator members of smaller size than the insulating block.

8. A base plate assembly for socket-type watt-hour meters including a base plate, insulating means mounted on the base plate and extending therethrough, a conductor carried by the insulating means, a connecting strap connected to the conductor and extending to a point remote therefrom, and a plug-in blade adapted to be mounted on the insulating means at the point of the conductor extending therethrough, being then connected directly to the conductor, and at the remote point alternatively, being then connected to the conductor through the connecting strap.

9. A base plate assembly for a socket-type two element meter including a base plate, a common potential connection unit comprising an insulating block extending through the base plate and provided with two upstanding posts adapted to straddle another portion of the base plate assembly, a pair of binding posts extending through the insulating block, one through each post, a connecting strap connecting the posts of the insulating block and extending to a remote point on the back side of the base plate, and a plug-in blade adapted to be fastened over the connecting strap optionally at said remote point or onto said binding posts whereby the base plate assembly may be adapted for engagement with either of two different forms of socket, the blade being electrically connected to both binding posts in either event.

10. A base plate assembly for socket-type watt-hour meters including a metallic base plate, a molded insulating block thereon subject to surface carbonization by an electric current, a blade at times positioned thereon for engaging one form of socket, a second insulating block mounted on the base plate and adapted to carry said blade at times for engaging a different form of socket, a connecting strap extending between the insulating blocks, and a fibrous sheet insulator not subject to such carbonization inserted between the base plate and the first named insulating block in the vicinity of the connecting strap to elongate the path between the connecting strap and the base plate along the surface of the first named insulating block.

11. The combination of an insulating block formed of a material subject to surface carbonization by an electric current, a pair of connecting straps supported by the insulating block and passing one over the other in close proximity whereby the minimum surface distance between the two connecting straps along the terminal block would normally be unsafe from the standpoint of surface carbonization, and a pair of inserts one of a similar insulating material and another of an insulating material not subject to such carbonization inserted between the terminal block and the insert of like material to elongate the minimum surface path between connecting straps.

12. A base plate assembly for socket-type watt-hour meters including a base plate, insulating means mounted on the base plate and extending therethrough, a conductor carried by the insulating means, a connecting strap connected to the conductor and extending to a point remote therefrom, and a plug-in blade adapted to be mounted on the insulating means at the point of the conductor extending therethrough, being then connected directly to the conductor, and at the remote point alternatively, being then connected to the conductor through the connecting strap, said blade being secured in either position by means readily removable from the side of the base on which said blade is located.

STANLEY S. GREEN.
RICHARD A. ROAD.